Sept. 2, 1941.　　　O. W. SJOGREN ET AL　　　2,254,324
CABLE LAYER
Filed Jan. 10, 1940　　　2 Sheets-Sheet 1
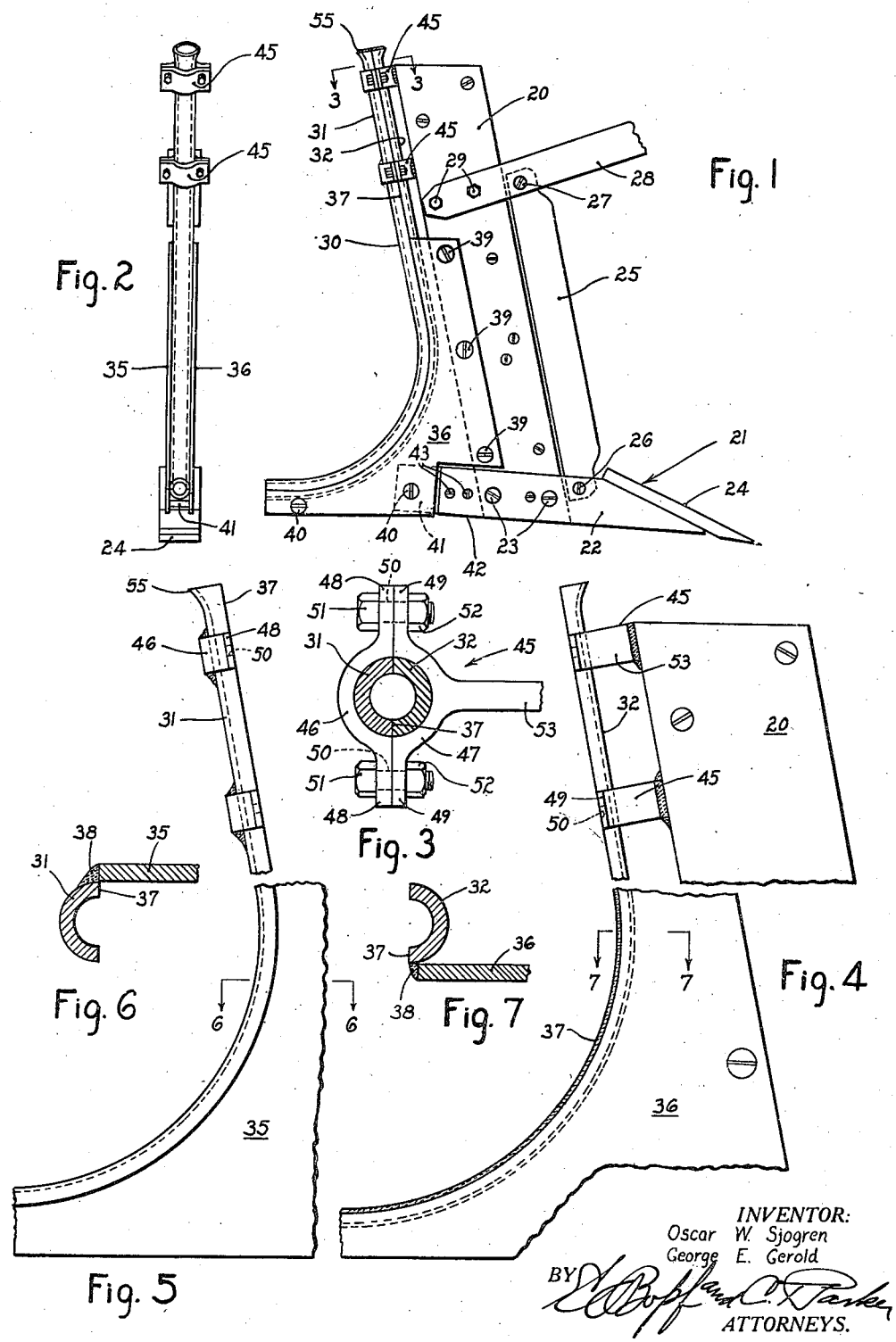
INVENTOR:
Oscar W. Sjogren
George E. Gerold
BY
ATTORNEYS.

Sept. 2, 1941.  O. W. SJOGREN ET AL  2,254,324
CABLE LAYER
Filed Jan. 10, 1940   2 Sheets-Sheet 2
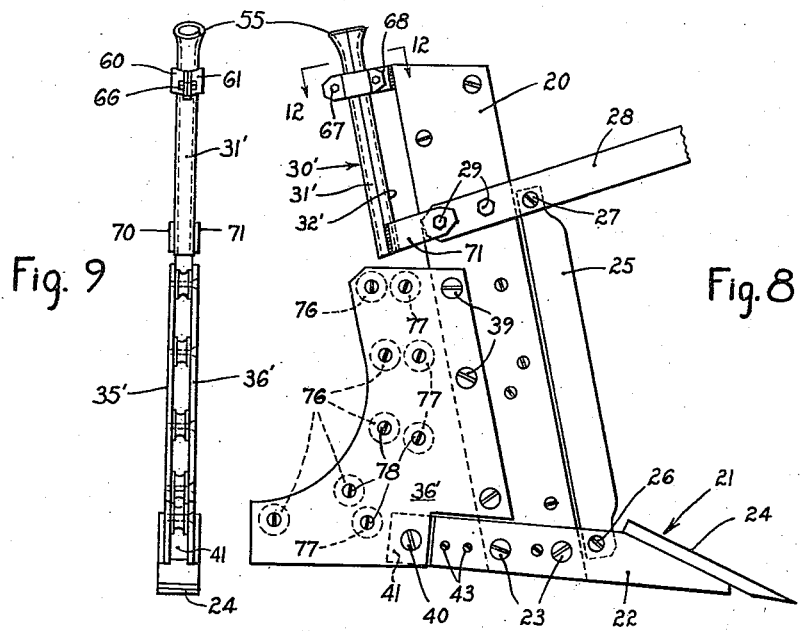
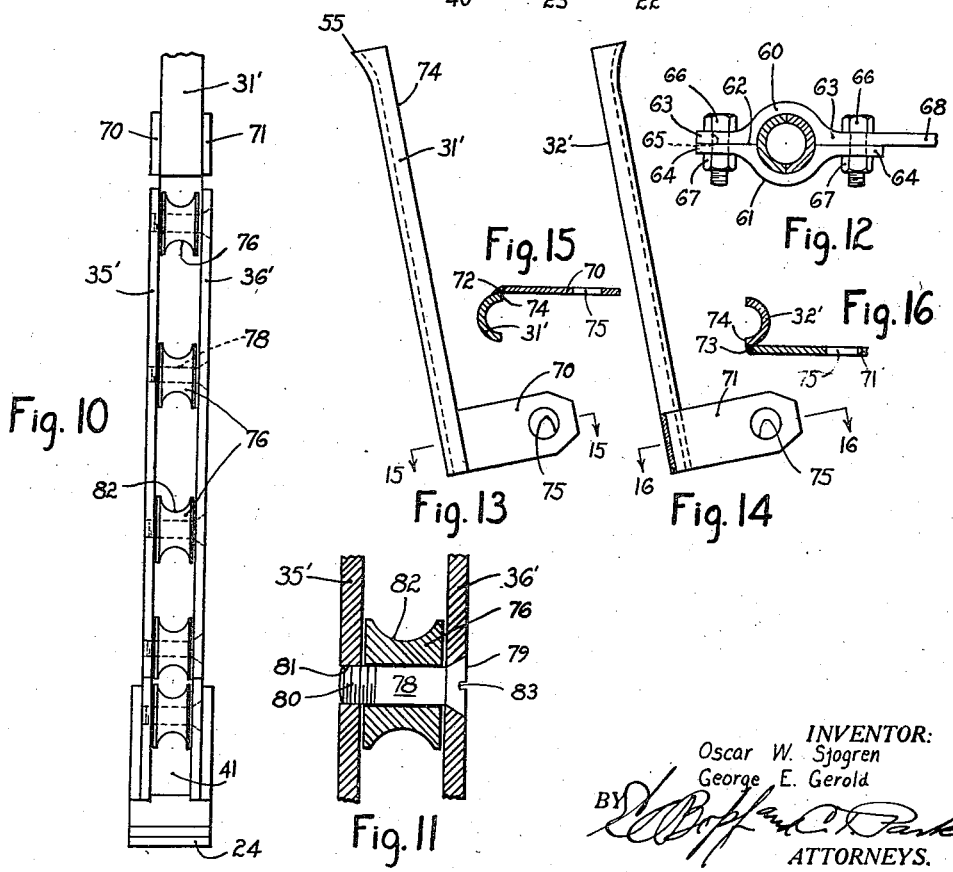
INVENTOR:
Oscar W. Sjogren
George E. Gerold
BY
ATTORNEYS.

Patented Sept. 2, 1941

2,254,324

UNITED STATES PATENT OFFICE 2,254,324

CABLE LAYER

Oscar W. Sjogren, Huntington Park, and George E. Gerold, Los Angeles, Calif., assignors to Killefer Manufacturing Corporation, Los Angeles, Calif., a corporation of California Application January 10, 1940, Serial No. 313,242

12 Claims. (Cl. 111—5)

The present invention relates to cable laying implements and more particularly to cable guides of the type adapted to be mounted along the rear edge of a ground opening tool carrying standard for guiding a cable from a reel, usually carried on the cable laying implement frame, into the bottom of the slot in the ground opened by the implement tool.

When laying a cable by means of an implement of this type, it is frequently desirable to move the implement to another location, after a portion of the cable on the reel has been laid. At the present time the usual cable guide consists of a tube which is supported on the rear edge of the tool carrying standard and curving rearwardly therefrom at the lower end. It is not possible to remove from the implement the reel of cable which has been partially laid in the ground, without cutting the cable to permit removing it from the tube, or as alternatives, unreeling the cable from the spool or pulling up the portion of the cable already laid. Accordingly, it is the principal object of our invention to provide a cable guide which can be opened along its length to permit removal of the cable therefrom.

We will now describe illustrative embodiments of our invention, reference being had to the appended drawings, in which Figure 1 is a side elevational view of the tool carrying standard of a cable laying implement showing a cable guide embodying the principles of our invention;

Figure 2 is a rear elevational view of the device shown in Figure 1;

Figure 3 is a sectional view taken along a line 3—3 of Figure 1;

Figure 4 is a broken side elevational view drawn to an enlarged scale showing the tool carrying standard and cable guide with the rear section of the cable guide removed;

Figure 5 is a broken side elevational view of the removable rear section of the cable guide;

Figure 6 is a sectional detail taken along a line 6—6 in Figure 5;

Figure 7 is a sectional detail taken along a line 7—7 in Figure 4;

Figure 8 is a side elevational view of a tool carrying standard and a cable guide, illustrating a second embodiment of our invention;

Figure 9 is a rear elevational view of the modified form shown in Figure 8;

Figure 10 is an enlarged rear elevational view of the lower portion of the cable guide shown in Figures 8 and 9;

Figure 11 is a sectional view taken through the center line of one of the guide rollers;

Figure 12 is a sectional view taken along a line 12—12 in Figure 8 and showing the detail of the upper support for the guide tube;

Figure 13 is an elevational view of the rear section of the guide tube shown in Figures 8 and 9;

Figure 14 is an elevational view showing the front section of the guide tube;

Figure 15 is a sectional view taken along a line 15—15 in Figure 13; and

Figure 16 is a sectional view taken along a line 16—16 in Figure 14.

Referring now to the drawings and more particularly to Figures 1 to 7, inclusive, reference numeral 20 indicates a generally vertically disposed standard adapted to be connected at its upper end to the draft frame of a suitable cable laying implement of any type known to those skilled in the art. At the lower end of the standard 20 is supported a tunnelling or burrowing tool 21 comprising a foot member 22 rigidly fixed to the end of the standard 20 by means of countersunk cap screws 23 and extending forwardly therefrom, and a tool blade 24 supported on the forward end of the foot 22. A vertically disposed shin blade 25 is connected at its lower end by means of a cap screw 26 to the foot 22 and extends upwardly along the forward edge of the standard 20 for the purpose of cutting a slot in the ground ahead of the standard to facilitate passage of the latter therethrough. The upper end of the shin blade 25 is connected by means of a cap screw 27 to a forwardly and upwardly extending brace member 28. The brace is fixed at its rear end to the standard 20 by means of bolts 29 and at its forward end to the implement draft frame (not shown).

A cable guide, indicated generally by reference numeral 30, comprises a tube disposed generally vertically behind the standard and divided along a transversely extending plane through the axis of the tube to form front and rear sections 31, 32. The lower end of the tube is curved rearwardly and terminates on a generally horizontal axis at the lower end of the standard behind the tool 21.

The lower curved end of the tube 30 is supported on the standard 20 by means of a pair of longitudinally extending, laterally spaced supporting plates 35, 36 disposed on opposite sides of the tube, respectively. The rear edges of the plates 35, 36 are curved to follow the line of division 37 of the tube sections and each of the sections 31, 32 is fixed by means of a weld 38 along the edge of its respective supporting plate. The width of spacing of the plates 35, 36 is equal to the width of the standard 20 and thus the plates are supported on the standard which is received between the plates and is bolted thereto by means of countersunk flat head cap screws 39 extending through aligned apertures in the standard 20 and plates 35, 36. Other cap screws 40 are provided in the rearwardly extending portions of the plates for the purpose of securing the latter together rigidly and the plates are spaced apart by means of a spacing member 41 supported on the forward screw 40 and extending forwardly therefrom and supported at its forward end on a rearwardly extending portion 42 of the foot member 22 by means of cap screws 43. The foot member 22 comprises a pair of bar members disposed on opposite sides of the lower end of the standard 20 and secured thereto by screws 23.

The upper end of the tube 30 is supported in a pair of vertically spaced clamps 45, each comprising a pair of separable clamping members 46, 47 divided along the plane of division 37 of the guide tube 30 and having laterally outwardly extending clamping lugs 48, 49, respectively, provided with aligned apertures 50 adapted to receive a clamping bolt 51 which is secured by a nut 52. A supporting arm 53 is formed integrally with the forward clamping member 47 and is rigidly secured, as by welding, to the rear edge of the standard 20. The rear clamping members 46 are preferably welded to the rear tube element 31.

It is not necessary to separate the tube elements 31, 32 when a new reel of cable is installed on the implement, for the upper end of the cable may be inserted into the upper flared end 55 of the tube 30 and pushed downwardly through the tube until the end of the cable comes out through the lower horizontal portion of the tube. As the implement moves forwardly the cable is unwound from the reel and is fed downwardly through the tube into the bottom of the slot in the ground opened by the tool blade 24. Whenever it is necessary to interrupt the laying of the cable without cutting the cable from the reel, the nuts 52 are removed from the bolts 51 to release the upper end of the tube from the clamps 45 and the screws 39, 40 are removed from the plates 35, 36 after which the rear tube element 31 together with the left-hand plate 35 to which it is attached, can be lifted away from the forward tube element 32 and thus permitting the cable to be lifted from the machine after which the reel on which the cable is wound can be placed on the ground. The cable laying implement is now free for removal to another location, but whenever it is desired to continue the laying of the partially laid reel of cable, the latter can be reinstalled on the implement by separating the tube sections 31, 32, placing the cable therein, and then clamping the tube sections together onto the standard 20 once more by replacing the screws 39, 40 and bolts 51.

Referring now more particularly to Figures 8 to 16, inclusive, in which a modified form of our invention is disclosed for the purpose of handling cable having armor or insulation of such nature that it is not well adapted to be pulled through a curved tube, the lower curved portion of the guide tube disclosed hereinbefore has been replaced by anti-friction guide means to be disclosed hereinafter but which incorporates the principle of divisibility of the cable guide for the purpose of removing a partially laid cable therefrom. In this embodiment the upper straight portion of the tube, designated by reference numeral 30', is retained and comprises a pair of separable front and rear portions or elements 31', 32', respectively. The upper end of the guide 30' is detachably clamped to the upper end of the tool standard 20 by means of a pair of cooperative clamp members 60, 61 which in this embodiment are separable along a fore and aft extending line of division 62 and are provided with clamping lugs 63, 64, respectively, which have aligned apertures 65 adapted to receive bolts 66, the latter being secured by nuts 67. The securing lugs 63 of one of the clamping members 60 has a forward extension 68 which is adapted to be fixed, as by welding, to the rear edge of the standard 20 at the upper end thereof. The lower ends of the tube elements 31', 32' are supported by means of a pair of plate members 70, 71 extending forwardly in parallel relation from the lower end of the tube 30'. Each of the plate members 70, 71 is fixed to one of the tube sections, respectively, by means of a weld 72, 73 adjacent the line of division 74 of the latter. The forward ends of the plate members 70, 71 are provided with aligned apertures 75 which are adapted to receive the rear brace securing bolt 29 to attach the strap members rigidly on opposite sides of the tool standard 20.

In this embodiment the lower curved portion of the guide tube is replaced by a plurality of pairs of cooperative guide rollers 76, 77. One roller 76 of each pair engages the rear side of the cable, and the other roller 77 of each pair engages the forward side of the cable. Each roller is rotatably mounted on a cap screw 78, one end of which has a flat head 79 countersunk in one of the plates 36', and the other end 80 is threaded and engages a threaded aperture 81 in the opposite plate 35'. Thus it is evident that the side plates 35', 36' provide a casing for the cable and the latter is guided through a curved path by means of the pairs of cooperative front and rear rollers 77, 76, respectively. The surfaces 82 of the rollers are concave in form to provide a suitable bearing surface for the cable.

The operation of this embodiment of the present invention is similar to that described in connection with the first embodiment except that the lower portion of the cable is removed from the casing formed by the side plates 35', 36' by removing the rear roller 76 of each pair of cooperative rollers. This is accomplished simply by inserting a screw driver into a suitable slot 83 in the head 79 of each bolt 78 and unscrewing the latter from the side plate 35'. After the rollers 76 have been removed, the cable can then be lifted out of the casing through the open rear end of the space between the plates 35', 36'. If desired, the cable can be removed from the side of the guide by taking off the side plate 35' after releasing its securing screws. The upper tubular cable guide 30' can be detached and separated by removing the bolts 66 from the upper clamp members 60, 61 and removing the rear bolt 29 from the lower strap members 70, 71.

We do not intend our invention to be limited to the precise details shown and described herein. What we desire to protect by Letters Patent is set forth in the following claims.

We claim:

1. A cable guide for a cable laying implement having a ground working tool carrying standard, said guide comprising a tube divided longitudinally to provide a pair of separable cooperable sections, means for detachably securing said sections together, and means for securing said guide tube vertically along the rear of said standard.

2. A cable guide for a cable laying implement having a ground working tool carrying standard, said guide comprising a tube divided longitudinally to provide a pair of separable cooperable sections, and detachable means securing said sections together comprising a pair of cooperative clamping members, at least one of said members having supporting means adapted to be attached to said standard, and bolts for securing said clamping members together.

3. A cable guide for a cable laying implement having a ground working tool carrying standard, said guide comprising a tube divided longitudinally to provide a pair of separable cooperable sections, and detachable means securing said sections together comprising a pair of plates fixed to said sections, respectively, and means for detachably securing said plates to said standard.

4. A cable guide for a cable laying implement having a tool carrying standard, said guide comprising a tube disposed generally vertically behind said standard and divided along a transversely disposed, axially extending plane to form front and rear sections, detachable means for securing said sections together, and means for mounting said tube on said standard.

5. A cable guide for a cable laying implement having a tool carrying standard, said guide comprising a tube disposed generally vertically behind said standard and divided along a transversely disposed, axially extending plane to form front and rear sections, a pair of suporting plates disposed in laterally spaced, longitudinally extending planes, each of said plates being attached to one of said sections, and means for securing said plates to said tool standard.

6. A cable guide for a cable laying implement having a tool carrying standard, said guide comprising a tube disposed generally vertically behind said standard and divided along a transversely disposed, axially extending plane to form front and rear sections, the lower end of said tube being curved rearwardly and terminating on a generally horizontal axis at the lower end of said standard, detachable means for securing said sections together, and means for mounting said tube on said standard.

7. A cable guide for a cable laying implement having a tool carrying standard, said guide comprising a tube disposed generally vertically behind said standard and divided along a transversely disposed, axially extending plane to form front and rear sections, the lower end of said tube being curved rearwardly and terminating on a generally horizontal axis at the lower end of said standard, a pair of longitudinally extending supporting plates disposed on opposite sides of said tube, respectively, the rear edges of said plates being curved to follow the line of division of said tube sections, each of said sections being fixed to one of said plates, and means for securing said plates to said standard.

8. A cable guide for a cable laying implement having a tool carrying standard, said guide comprising a pair of longitudinally extending laterally spaced plates fixed to said standard, providing a cable receiving casing open at the rear, a plurality of bolts disposed transversely between said plates, and a roller journaled on each of said bolts, the latter being readily removable to provide for removing a cable through the rear opening of said casing.

9. A cable guide for a cable laying implement having a tool carrying standard, said guide comprising a pair of longitudinally extending laterally spaced plates fixed to said standard, providing a cable receiving casing open at the rear, a plurality of bolts disposed transversely between said plates and having threads engaging one of said plates and heads countersunk in the other plate, and a roller journaled on each of said bolts, the latter being readily removable to provide for removing a cable through the rear opening of said casing.

10. A cable guide for a cable laying implement having a tool carrying standard, said guide comprising a pair of longitudinally extending laterally spaced plates fixed to said standard, providing a cable receiving casing open at the rear, a pair of fore and aft spaced rows of bolts disposed transversely between said plates, and a roller journaled on each of said bolts, the rollers on said two rows of bolts being adapted to receive a cable between them, the bolts in the rear row being readily removable to provide for removing the cable through the rear opening of said casing.

11. A cable guide for a cable laying implement having a ground working tool carrying standard, said guide comprising a pair of separable cooperable sections disposed generally vertically along the rear of said standard and defining a rearwardly curved guide passage, means for detachably securing said sections together, and means for securing said guide to the rear of said standard.

12. In a cable laying implement having a ground working tool carrying standard, means at the lower end of said standard defining a rearwardly curving guide for a cable, means for attaching said guide means to said standard, said guide means having one wall removable to permit a cable to be placed therein or removed therefrom, and means for detachably securing said removable wall to said guide means.

OSCAR W. SJOGREN.
GEORGE E. GEROLD.